(12) United States Patent
Olson et al.

(10) Patent No.: US 9,234,352 B2
(45) Date of Patent: Jan. 12, 2016

(54) ROOFING MEMBRANES HAVING MULTIPLE ADHESIVE REGIONS AND METHOD THEREFOR

(71) Applicant: JOHNS MANVILLE, Denver, CO (US)

(72) Inventors: Eric Alden Olson, Thornton, CO (US); Jordan Kortmeyer, Parker, CO (US); Zebonie Sukle, Denver, CO (US)

(73) Assignee: Johns Manville, Denver, CO (US)

( * ) Notice: Subject to any disclaimer, the term of this patent is extended or adjusted under 35 U.S.C. 154(b) by 0 days.

(21) Appl. No.: 14/180,831

(22) Filed: Feb. 14, 2014

(65) Prior Publication Data

US 2015/0233120 A1    Aug. 20, 2015

(51) Int. Cl.
*E04D 5/14* (2006.01)
*B32B 7/06* (2006.01)
*B32B 7/12* (2006.01)

(52) U.S. Cl.
CPC ... *E04D 5/14* (2013.01); *B32B 7/06* (2013.01); *B32B 7/12* (2013.01); *E04D 5/141* (2013.01); *E04D 5/142* (2013.01); *E04D 5/144* (2013.01); *E04D 5/146* (2013.01); *E04D 5/148* (2013.01); *B32B 2419/06* (2013.01); *Y10T 428/1476* (2015.01)

(58) Field of Classification Search
CPC .......... E04D 5/148; E04D 5/14; E04D 5/141; E04D 5/142; E04D 5/144; E04D 5/146; B32B 7/06; B32B 7/12; B32B 2419/06; Y10T 428/1476
USPC .................................. 428/41.8; 52/408, 411
See application file for complete search history.

(56) References Cited

U.S. PATENT DOCUMENTS

| | | | |
|---|---|---|---|
| 4,421,807 A * | 12/1983 | Clausing et al. | 428/40.3 |
| 7,198,220 B2 * | 4/2007 | Knowlton | 242/530.2 |
| 7,685,785 B2 * | 3/2010 | Johnson | 52/409 |
| 8,505,249 B2 * | 8/2013 | Geary | 52/173.3 |
| 8,709,565 B2 * | 4/2014 | Kalwara et al. | 428/40.1 |
| 2012/0045623 A1 * | 2/2012 | Delaney et al. | 428/189 |

* cited by examiner

*Primary Examiner* — Andrew J Triggs
(74) *Attorney, Agent, or Firm* — Robert D. Touslee

(57) ABSTRACT

According to one embodiment, a roof membrane is provided. The roofing membrane includes a main body, a first adhesive material, and a second adhesive material. The first adhesive material is bonded to a top surface of the main body and positioned toward a first edge thereof. The second adhesive material is bonded to a bottom surface of the main body and positioned toward a second edge thereof. The second edge is positioned opposite the first edge such that the first and second adhesive materials are positioned toward opposite edges of the main body and on opposite surfaces thereof.

14 Claims, 3 Drawing Sheets

ROOFING MEMBRANES HAVING MULTIPLE ADHESIVE REGIONS AND METHOD THEREFOR

BACKGROUND OF THE INVENTION

Roofing membranes are commonly used for roofing systems of building and structures. Roofing membranes are often applied to the building or structure's roof to prevent leaks and/or to provide aesthetic appeal. Roofing membranes are commonly made of various synthetic rubber materials, modified bitumen, or thermoplastic materials.

Two common types of roofing membrane include those made of thermoplastic polyolefin (TPO) and those made of ethylene propylene diene monomer rubber (EPDM). TPO membranes are often white, but may be made in various other colors or shades, such as grey, black, and the like. Similarly, EPDM membranes are often black, but in some embodiments may also be white. White roofing membranes are often used to provide a pleasing visual appeal and/or to reflect radiation and thereby minimize heat island effects. Individual sections of EPDM membranes are often bonded together by priming or preparing an edges of the EPDM membranes and then applying a tape to the primed or prepared edges. Individual sections of TPO membranes are often coupled together by overlapping adjacent edges and heat welding the edges together. TPO may also be bonded by priming adjacent edges and using a tape.

BRIEF SUMMARY OF THE INVENTION

The embodiments described herein provide roofing membranes that may be easily installed atop a roof. Installation of the roofing membranes is simplified by the incorporation of adhesive material and/or tape layers on opposing ends or edges of the roofing membrane. Each adhesive material and/or tape layer is positioned on an opposing surface of the roofing membrane in order to allow the edges of adjacent membranes to be overlapped and coupled or bonded together. According to one aspect, a roofing membrane is provided. The roofing membrane includes a main body having a top surface, a bottom surface positioned opposite the top surface, and four edges that define an outer periphery of the main body such that the main body. The main body typically has a rectangular or square profile, although the main body is not limited to such a configuration. A first adhesive material and/or tape is bonded to the top surface of the main body and positioned toward a first edge thereof. The first adhesive material normally extends along a majority of a length of the first edge and commonly extends along roughly the entire length of the first edge.

A second adhesive material is bonded to the bottom surface of the main body and positioned toward a second edge thereof. The second adhesive material normally extends along a majority of a length of the second edge and commonly extends along roughly the entire length of the second edge. The second edge is positioned opposite the first edge so that the first and second adhesive materials are positioned toward opposite edges of the main body and on opposite surfaces thereof. The roofing membrane may also include a membrane material that is releasably coupled with a top surface of the first adhesive material and/or the second adhesive material to reduce environmental exposure of the adhesive material.

In some embodiments, a layer of the first adhesive material and a layer of the second adhesive material may have roughly the same width atop the respective surfaces of the main body. In other embodiments, the layer of the first adhesive material may have a greater width than the layer of the second adhesive material atop the respective surfaces of the main body, or vice versa. In some embodiments, the layer of the first adhesive material and/or second adhesive material may have a width of between about ½ and 8 inches.

In some embodiments, the first adhesive material and/or the second adhesive material may be bonded to the respective surfaces of the main body so that an edge of the respective adhesive material is aligned with the respective edge of the main body. In other embodiments, the first adhesive material and/or the second adhesive material may be bonded to the respective surfaces of the main body so that an edge of the respective adhesive material is offset from the respective edge of the main body.

According to another aspect, a roof membrane system is provided. The roof membrane system includes a first membrane positioned atop the roof. The first membrane has a distal edge that includes a first adhesive material on a top surface thereof. The first adhesive material may extend along a majority of a length of the distal edge or along roughly the entire edge. The roof membrane system also includes a second membrane positioned atop the roof and adjacent the first membrane so that a proximal edge of the second membrane overlaps with and is bonded to the distal edge of the first membrane. The proximal edge of the second membrane includes a second adhesive material on a bottom surface thereof. The second adhesive material extends along a majority of a length of the proximal edge, or along the entire length, and is bonded with the first adhesive material.

A first membrane material may be releasably coupled with a top surface of the first adhesive material and a second membrane material may be releasably coupled with a top surface of the second adhesive material. In some embodiments, the first adhesive material and the second adhesive material may have roughly the same width. In some embodiments, the first adhesive material may be aligned with the distal edge of the first membrane and the second adhesive material may be offset from the proximal edge of the second membrane, or vice versa.

According to another aspect, a method of coupling roofing membranes atop a roof is provided. The method includes positioning a first roofing membrane atop the roof, the first roofing membrane having a main body that includes a top surface, a bottom surface positioned opposite the top surface, and four edges that define an outer periphery so that the first roofing membrane has a rectangular or square profile. The method also includes positioning a second roofing membrane atop the roof and adjacent the first roofing membrane so that a proximal edge of the second roofing membrane overlaps with a distal edge of the first roofing membrane. The second roofing membrane has a configuration similar to the first roofing membrane. A first adhesive material is bonded to the first roofing membrane toward the distal edge thereof and a second adhesive material is bonded to the second roofing membrane toward the proximal edge thereof. The first adhesive material and second adhesive material may extend along a majority of a length of the respective edge, or along roughly the entire length. The method further includes bonding the first adhesive material with the second adhesive material to couple the first and second roofing membranes together.

In some embodiments, the method may additionally include removing a membrane material that is releasably coupled with the first adhesive material and/or the second adhesive material prior to said bonding of the first adhesive material and second adhesive material. In some embodiments, the first adhesive material and the second adhesive material may have roughly the same width. In other embodiments, the width of the first adhesive material may be smaller than the width of the second adhesive material, or vice versa.

In some embodiments, the method may additionally include aligning the first adhesive material with the second adhesive material so that an edge of the first adhesive materials aligns with an edge of the second adhesive material. In other embodiments, the method may include aligning the first adhesive material with the second adhesive material so that an edge of the first adhesive materials is offset from an edge of the second adhesive material.

According to another aspect, a method of coupling roofing membranes atop a roof is provided. The method includes positioning a first membrane atop the roof, positioning a second membrane atop the roof, and overlapping a proximal edge of the second membrane and a distal edge of the first membrane. The distal edge of the first membrane includes a first adhesive material on a top surface thereof that extends along a majority of a length of the distal edge and the proximal edge of the second membrane includes a second adhesive material on a bottom surface thereof that extends along a majority of a length of the proximal edge. The method also includes bonding the first adhesive material with the second adhesive material to couple the first and second membranes together atop the roof.

In some embodiments, the method further includes removing a membrane material from the first adhesive material and/or the second adhesive material. The membrane material may limit the environmental exposure of the adhesive material. In some embodiments, the method additionally includes aligning the first adhesive material with the second adhesive material so that an edge of the first adhesive materials aligns with an edge of the second adhesive material. In other embodiments, the method includes aligning the first adhesive material with the second adhesive material so that an edge of the first adhesive materials is offset from an edge of the second adhesive material. The method may additionally include coupling the first membrane and/or the second membrane with the roof via ballasting, mechanically fastening, heat welding, adhesive bonding, and the like.

BRIEF DESCRIPTION OF THE DRAWINGS

The present invention is described in conjunction with the appended figures.

Figure 1:
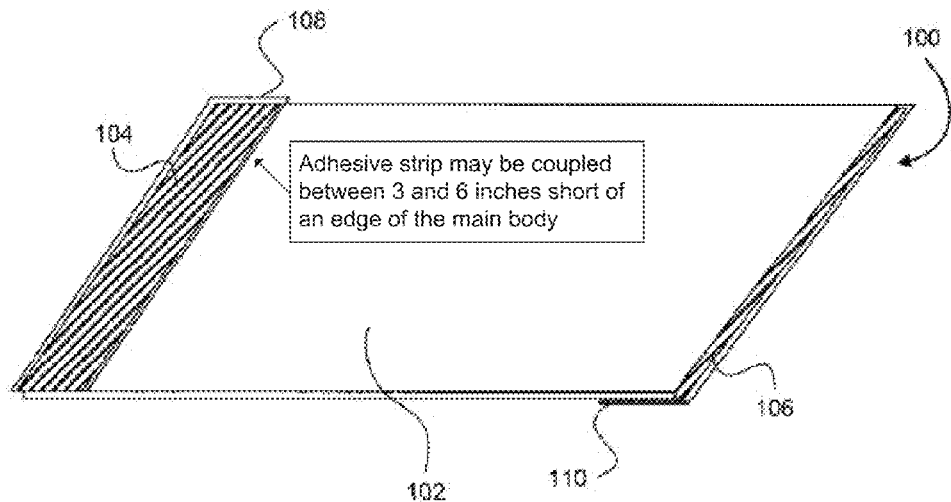
FIG. 1 illustrates a perspective view of an embodiment of a roofing membrane having multiple adhesive regions.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

The embodiments described herein provide roofing membranes that may be easily installed atop a roof. Installation of the roofing membranes is simplified by the incorporation of adhesive material and/or tape layers on opposing ends or edges of the roofing membrane. Each adhesive material and/or tape layer is positioned on an opposing surface of the roofing membrane in order to allow the edges of adjacent membranes to be overlapped and coupled or bonded together. For convenience in describing the embodiments herein, the adhesive material and/or tape will be generally described as an adhesive material or adhesive layer. It should be realized, however, that the description of the adhesive material or layer may encompass a variety of adhesives and/or tape layers. In some embodiments, the tapes and/or adhesive materials may be of the same material composition or could formed of various compositions including but not limited to reactive chemistries, pressure sensitive systems, and the like.

A releasable tape or liner may be releasably coupled to each of the adhesive materials to limit environmental exposure of the adhesive material and thereby maintain the adhesive properties of the material. The releasable liner of adjacent membranes may be easily removed at the job site prior to coupling of the membranes. The use of the releasable liner eliminates, or greatly reduces, the need for priming or preparation of the roofing membranes prior to coupling of the membranes. For example, an installer does not need to apply a solvent or solution to the roofing membrane in order to remove debris, oils, or other contamination that may impede or alter the coupling or bonding of adjacent roofing membranes. The elimination or reduction of this installation step greatly decreases the time in which a roof membrane system may be installed.

As used herein, the term roofing membrane means essentially any material that is installed atop a roof, typically as an outer surface or layer. Such roofing membranes are commonly installed for various functional and/or aesthetic purposes. For example, roofing membranes may be installed to provide weather proofing, reduce urban heat island effects via heat reflection, reduce UV damage, reduce roof maintenance and/or degradation, improving weathering characteristics, and the like. Roofing membranes may also provide a sleek and/or desired roof appearance, such as a uniform roof color and/or style.

Common roofing membranes include various thermoset materials, such as ethylene propylene diene monomer rubber (EPDM), and various thermoplastic materials, such as Thermoplastic PolyOlefin (TPO). The embodiments described herein may find particular usefulness for roofing membranes constructed or EPDM and/or TPO materials, although the embodiments may be used for other thermoset and/or thermoplastic roofing membranes as desired.

Roofing systems often include various materials and/or layers in addition to the roofing membranes. These layers/ materials are typically positioned under the roofing membrane and may include support members (e.g., wood and/or metal beams), insulation layers (e.g., foam and/or other insulating boards), and/or other boards or members. The roofing membrane may be coupled with one or more of these materials via ballasting, mechanically fastening, adhesive bonding, heat welding, and the like.

Conventional roofing membranes are typically coupled together by overlapping adjacent edges, preparing or priming one or more edges, and then using an adhesive material to bond the adjacent edges or heat welding the adjacent edges together. In priming or preparing the edges, the installer must wait for the primer material to flash before applying the adhesive. Improper application of the primer and/or adhesive may result in an improper bond, which may create immediate and/or long term roofing problems, such as leakage. Human error, such as non-uniform application of the primer and/or adhesive material, may also result in inadequate or insufficient membrane adhesion, which may create short term and/or long term problems. These and other issues are reduced or eliminated via the roofing membrane embodiments described herein.

Referring now to FIG. 1, illustrated is an embodiment of a roofing membrane 100 that may be constructed of a thermoset material (e.g., EPDM) or a thermoplastic material (e.g., TPO). Roofing membrane 100 includes a main body 102 having a top surface and a bottom surface positioned opposite the top surface. Main body 102 also includes for edges that defining an outer periphery of main body 102. Main body 102 typically has a square or rectangular profile. In many instances, main body 102 may have a lateral width of between about 10 and 40 feet, a longitudinal length of between about 50 and 100 feet, and a thickness of between about 0.045 and 0.090 inches, although it should be realized that these dimensions may vary depending on the application and/or need.

A first adhesive material or tape is bonded to, coupled to, or otherwise positioned atop the top surface of the main body 102. The first adhesive material or tape is positioned toward a first edge of the main body 102 and forms and adhesive material strip 104 or layer (hereinafter adhesive strip 104) atop the top surface of main body 102. The adhesive strip 104 extends along a majority of the first edge's length, and commonly along the entire length between opposing ends. The description of the adhesive strip 104 extending along the entire length of the first edge between opposing ends includes situations where the strip 104 is slightly shorter than the length of the first edge. For example, in some embodiments, the strip 104 may be coupled or bonded to the main body 102 between 3 and 6 inches short of an edge of the main body. In such embodiments, the last 3 to 6 inches on the end laps may be taped or adhered by a contractor or installer. The adhesive strip 104 is commonly between about 3 and 6 inches wide, although in some embodiments the strip 104 may be between ½ and 8 inches wide. The adhesive strip 104 may also be between 0.005 and 0.030 inches, and may be positioned with respect to main body 102 so that an edge of the adhesive strip 104 is aligned with, or offset from, the first edge as described in greater detail herein below. In other embodiments, adhesive strip 104 may have a width greater than 6 inches or less than 3 inches as desired.

A second adhesive material or tape is bonded to, coupled to, or otherwise positioned atop the bottom surface of main body 102. The second adhesive material or tape is positioned toward a second edge of the main body 102 and forms an adhesive material strip 106 or layer (hereinafter adhesive strip 106) atop the bottom surface of main body 102. Like adhesive strip 104, adhesive strip 106 extends along a majority of the second edge's length, and commonly along the entire length between opposing ends. Adhesive strip 106 commonly has a width of between 3 and 6 inches, although other widths may be employed. Adhesive strip 106 may also be aligned with or offset from the second edge of main body 102 as desired.

The second edge is positioned on an opposite side of main body 102 from the first edge so that opposing edges or ends of the main body 102 include the adhesive strips, 104 and 106. Further, the adhesive strips, 104 and 106, are positioned on opposing surfaces of the main body 102 to aid in coupling of adjacent roofing membranes 100 as described herein below. A releasable liner or tape is normally coupled with a top surface of the adhesive strips to prevent or limit environmental exposure of the adhesive material, which may degrade the adhesive material or otherwise compromise or interfere with bonding of the adhesive material. The releasable liner may also prevent premature drying or hardening of the adhesive material. The releasable liner may be constructed of a polymer or other material membrane, such as coated paper, metalized film, coated fabric, and the like, that releasably adheres to the adhesive material.

As shown in FIG. 1, a first liner or membrane 108 may be releasably coupled with adhesive strip 104 and a second liner or membrane 110 may be releasably coupled with adhesive strip 106. The liners, 108 and 110, may be sized slightly larger than the respective adhesive strips, 104 and 106, to allow the liners to fully cover and conceal the adhesive material. The slightly larger liners, 108 and 110, also make it easier for an installer to grasp an edge of the liner and remove the liner from the respective adhesive strips, 104 and 106, prior to or during installation of the roofing membrane 100.

The use of the adhesive strips, 104 and 106, on roofing membrane 100 decreases the amount of time required to install the membrane 100 onsite. For example, the adhesive strips, 104 and 106, eliminates the need for a contractor or installer to prime or prepare edges of the roofing membrane 100 in order to bond the roofing membrane 100 with an adjacent membrane. As such, an installer does not need to wait for the primer to flash, thereby decreasing the installer's wait time and allowing the installer to move on to the next stage of installation. Further, the adhesive strips, 104 and 106, may be bonded to the respective surfaces of main body 102 as part of the manufacturing process of the roofing membrane 100. Accordingly, the manufacturer has increased control over the bonding element or layer that is ultimately used in forming the roofing system, thereby eliminating or reducing human error and/or increasing the likelihood that the bonding element or layer is properly prepared. This may result in improved bonding between adjacent roofing membranes thereby minimizing or eliminating some or all of the short-term and long-term issues described above.

Figure 2:
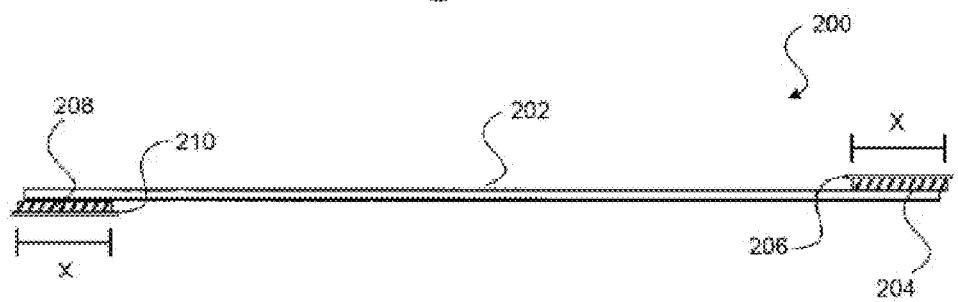
FIG. 2 illustrates a side view of an embodiment of a roofing membrane having multiple adhesive regions.

Referring now to FIG. 2, illustrated is another embodiment of a roofing membrane 200. Roofing membrane 200 is similar to membrane 100 in that membrane 200 has a main body 202 that includes a first adhesive strip 204 positioned on one side of the main body 202 and a second adhesive strip 208 positioned on an opposite side of the main body 202. As described above, the adhesive strips, 204 and 208, are positioned on opposing surfaces of main body 202. A releasable tape or liner 206 is releasably coupled atop the first adhesive strip 204 while a releasable tape or liner 210 is releasably coupled atop the second adhesive strip 208. FIG. 2 illustrates that the adhesive strips, 204 and 208, may be applied so as to have a relatively equal thickness and width on the opposing sides and surfaces of main body 202.

Employing relatively equal thickness and width adhesive strips, 204 and 208, may eliminate or reduce common problems associated with rolling up the membrane 200 for transportation and/or storage. For example, if membrane 200 includes only one adhesive strip material (i.e., 204 or 210), as the membrane 200 is rolled about a core, the single adhesive strip may cause the thickness of the roll to increase disproportionately on one side of the core, thereby varying the thickness of the roll product across the web of the roll. A varying thickness of the roll product may cause the roll product to telescope about the core during wind up and/or cause the membrane 200 to curve or bend as it is being unrolled atop a roof. In contrast, by applying the adhesive strips, 204 and 208, to opposing ends and/or surfaces of main body 202, the resulting roll product has a relatively equal thickness about the core, which aids in preventing telescoping during wind up and/or aids in keeping the membrane 200 straight as it is rolled out atop a roof.

Figure 3:
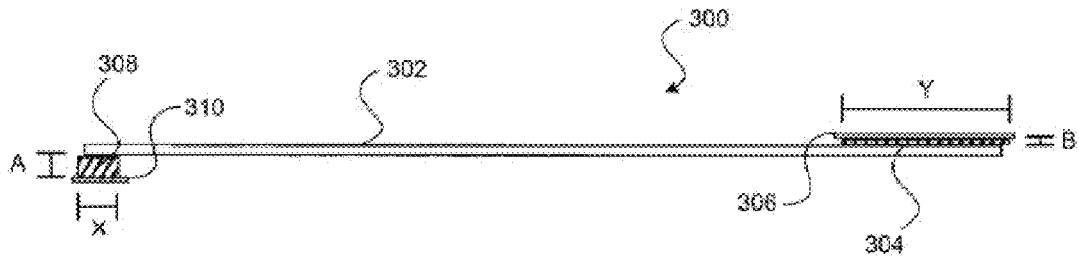
FIG. 3 illustrates a side view of another embodiment of a roofing membrane having multiple adhesive regions.

Referring now to FIG. 3, illustrated is another embodiment of a roofing membrane 300 having a main body 302 with an adhesive strip 304 positioned on one side of the main body 302 and another adhesive strip 308 positioned on an opposite side and opposite surface of the main body 302 as described above. Releasable liners, 306 and 310, are releasably coupled with a top surface of the respective adhesive strips, 304 and 308. The adhesive strips, 304 and 308, are different from those previously described in that the strips having varying widths and/or thicknesses. For example, adhesive strips 304 has a width of Y and a thickness of B while adhesive strip 308 has a width of X and a thickness of A. The widths and/or thicknesses of the respective adhesive strips, 304 and 308, may be within the ranges previously described. In some embodiments, the widths, Y and X, of the adhesive strips, 304 and 308 respectively, may vary, while in other embodiments the thicknesses, B and A, of the adhesive strips, 304 and 308 respectively, may vary. In some embodiments, both the widths and the thicknesses of the adhesive strips, 304 and 308, may vary.

Varying the widths and/or thicknesses of the adhesive strips, 304 and 308, may aid in coupling of adjacent roofing membranes and/or forming a roofing membrane system about a uniquely shaped roof. For example, wider and/or thinner adhesive strips (e.g., adhesive strip 304) may be used when a greater bonding surface area is desired while narrower and/or thicker adhesive strips (e.g., adhesive strips 308) may be used when an edge of the roofing membrane 300 is butted up against a corner of the roof. In some embodiments, the roofing system formed atop a roof may include a combination of roofing membranes having relatively equal sized adhesive strips and roofing membranes having relatively unequal sized adhesive strips as needed.

Figure 4:
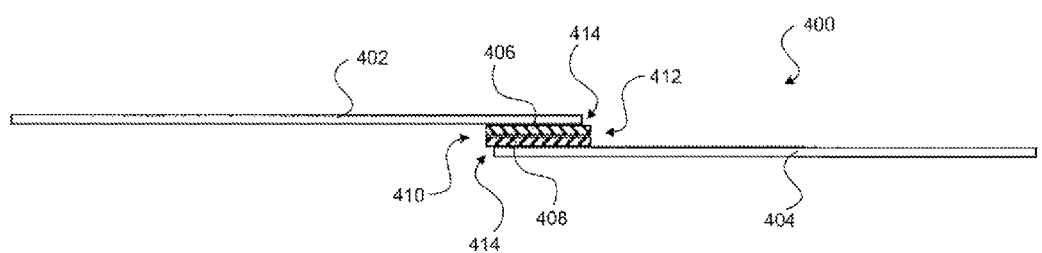
FIG. 4 illustrates a side view of an embodiment of a first roofing membrane and a second roofing membrane coupled together as part of a roofing system.
Figure 5:
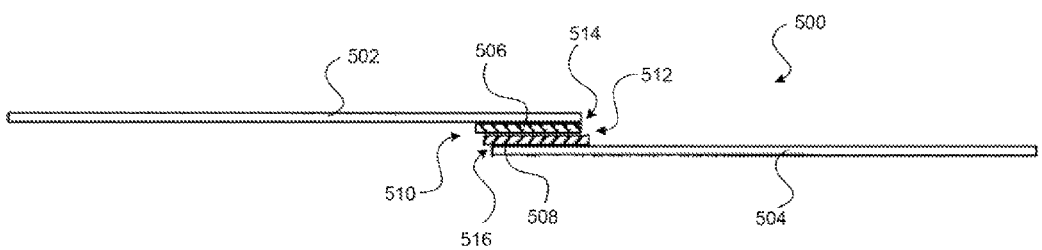
FIG. 5 illustrates a side view of another embodiment of a first roofing membrane and a second roofing membrane coupled together as part of a roofing system.

Referring now to FIGS. 4-5, illustrated are embodiments in which adjacent roofing membranes are coupled or bonded together to form a roofing system. For example, FIG. 4 illustrates a roofing system 400 formed of a bonded or coupled first roofing membrane 402 and second roofing membrane 404. The first and second roofing membranes, 402 and 404, may be constructed similarly to those described herein above having a main body with opposing ends and surfaces having an adhesive strip. In coupling or bonding the adjacent membranes, 402 and 404, a distal edge of membrane 402 is overlapped with a proximal edge of membrane 404 so that the adhesive materials, 406 and 408, of the respective membranes are vertically aligned. The releasable liners (not shown) of the adhesive materials, 406 and 408, may then be removed and the adhesive materials pressed together to couple or bond the membranes, 402 and 404, together. The adhesive strips, 406 and 408, bond well together eliminating the need to prime any membrane surface for bonding strength.

As shown in FIG. 4, the adhesive strips, 406 and 408, may be aligned relative to one another so that a proximal edge 410 and/or a distal edge 412 of each adhesive strip, 406 and 408, is aligned. Stated differently, the proximal edge 410 and/or distal edge 412 of the coupled strips, 406 and 408, may be relatively flush after the membranes, 402 and 404, are coupled together. Similarly, adhesive strip 406 and/or adhesive strip 408 may be offset 414 from the edge of the respective membrane, 402 and 404. In some embodiments, the adhesive strip or strips may be offset 414 from the respective membrane by between about $1/16$ and $1/4$ of an inch, and more commonly by about $1/8$ of an inch.

Offsetting the adhesive strips from the respective membranes in this manner may allow a contractor or installer to quickly and easily visually inspect the adhesive bond between the membranes, 402 and 404, and/or to determine that the coupled membranes provide a sufficient waterproofing layer. For example, after installation of the roofing system, a contractor or installer may quickly and easily traverse the roofing membranes' seams and inspect the bond between the coupled membranes by inspecting the portion of the adhesive strips that protrude from the seams. The contractor or installer may determine if any gaps or other irregularities exist in the coupled adhesive layers and/or between the adhesive layer and the respective membrane. The contractor or installer may also visually determine whether the coupled membranes are sufficiently waterproof by inspecting the protruding adhesive strips for gaps, cracks, separations, or any other defects that may signal an incomplete or otherwise improper bond between the adjacent membranes and/or adhesive layers that may result in water leakage or other potential problems.

The protrusion of the adhesive strips, 406 and 408, from the seam of the coupled membranes, 402 and 404, may also improve the waterproofing characteristics of the membrane system. For example, the protruding adhesive strip material may minimize or eliminate gaps that may otherwise be formed under the coupled membranes' seam within which water and/or ice may penetrate and cause leakage or other problems. In this manner, the protruding adhesive strip material may function similar to caulking to effectively seal the seams and may eliminate the need for a separate caulking step to be performed.

FIG. 5 illustrates another embodiment of a roofing system 500 having a first roofing membrane 502 bonded or coupled with a second roofing membrane 504. Similar to roofing system 400, the membranes, 502 and 504, of system 500 are bonded by aligning and pressing together respective adhesive strips, 506 and 508. Unlike system 400, however, the adhesive strip 506 of membrane 502 is aligned with membrane 502's distal edge 514 while the adhesive strip 508 of membrane 504 is offset from membrane 504's proximal edge 516. The difference in alignment of the adhesive strips, 506 and 508, results in an offset or staggered alignment of the coupled adhesive strips proximal edge 510 and/or distal edge 512. This staggered relationship of the adhesive strips may aid in the visual inspection of the coupled membranes by visually delineating the bonding interface between the adhesive strips, 502 and 504. The staggered relationship of the adhesive strips may also minimize or eliminate formation of folds or defects during installation, which may improve the waterproofing ability of the system 500. For example, the tape (e.g., butyl tape) is typically soft and easily deforms. In contrast, cured EPDM membranes typically have some stiffness and body so that they will not fold or crease as easily as the tape. As such, the cured EPDM membrane holds the tape in place, thus decreasing the chance for defects to form in the tape.

In any event, one of the adhesive strips should protrude from the seam of coupled membranes, 502 and 504, by between about 1/16 and 1/4 inch, and more commonly by about 1/8 inch to provide the visual inspection and/or waterproofing benefits previously described. Preferably the bottom or lower adhesive strip (i.e., adhesive strip 508 in FIG. 5) protrudes from the seam to prevent formation of gaps within which water or ice may penetrate.

Figure 6:
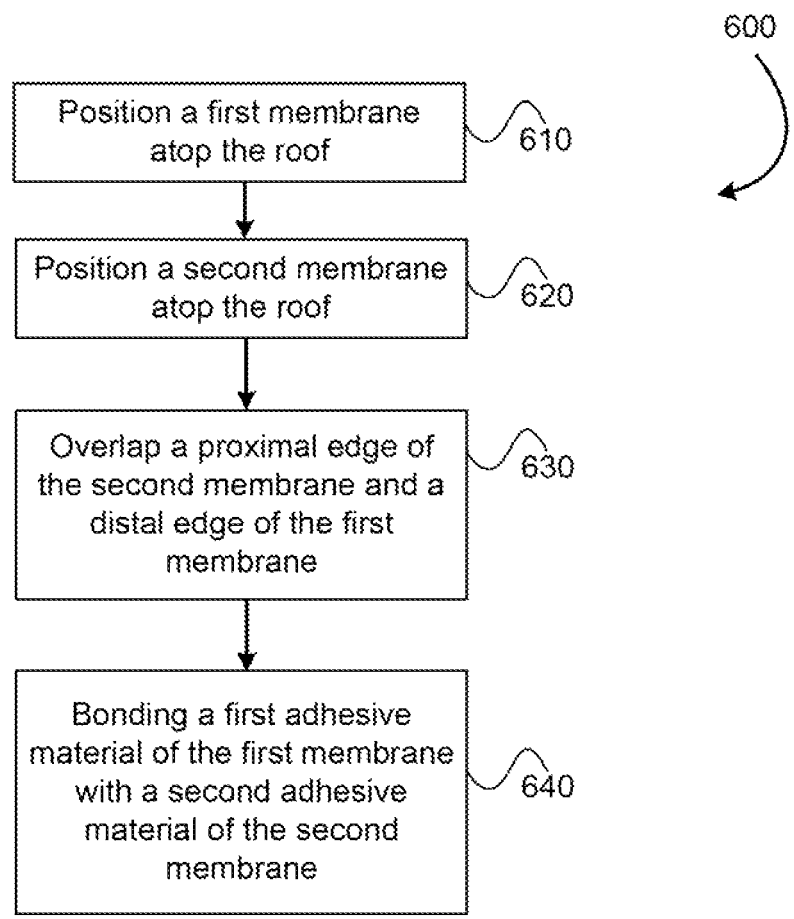
FIG. 6 illustrates a method of coupling roofing membranes atop a roof as part of a roofing system.

Referring now to FIG. 6, illustrated is a method 600 of coupling roofing membranes atop a roof. The roofing membranes may be similar to any of those described herein. At step 610, a first membrane is positioned atop the roof and at step 620, a second membrane is positioned atop the roof. At step 630, a proximal edge of the second membrane is overlapped with a distal edge of the first membrane. As described herein, the distal edge of the first membrane includes a first adhesive material on a top surface thereof that extends along a majority of a length of the distal edge and the proximal edge of the second membrane includes a second adhesive material on a bottom surface thereof that extends along a majority of a length of the proximal edge. At step 640, the first adhesive material is bonded with the second adhesive material to couple the first and second membranes together atop the roof.

In some embodiments, the method further includes removing a membrane material from either or both the first adhesive material or the second adhesive material. As described herein, the membrane material limits the environmental exposure of the adhesive material. In some embodiments, the first adhesive material and the second adhesive material have roughly the same width. In other embodiments, the width of the first adhesive material may be smaller than the width of the second adhesive material or vice versa.

In some embodiments, the method may also include aligning the first adhesive material with the second adhesive material so that an edge of the first adhesive materials aligns with an edge of the second adhesive material. In other embodiments, the method may include aligning the first adhesive material with the second adhesive material so that an edge of the first adhesive materials is offset from an edge of the second adhesive material. In any of the embodiments, the method may additionally include coupling either or both the first membrane or the second membrane with the roof via ballasting, mechanically fastening, heat welding, adhesive bonding, and the like.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the device" includes reference to one or more devices and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A roofing membrane comprising:
   a main body that is made of a material suitable for installation atop a roof surface for covering and protecting said surface, the main body having:
   a top surface;
   a bottom surface positioned opposite the top surface; and
   four edges that define an outer perimeter of the main body such that the main body has a rectangular or square profile;
   a first adhesive tape bonded to the top surface of the main body and positioned toward a first edge thereof, the first adhesive tape extending along a majority of a length of the first edge; and
   a second adhesive tape bonded to the bottom surface of the main body and positioned toward a second edge thereof, the second adhesive tape extending along a majority of a length of the second edge;
   wherein the second edge is positioned opposite the first edge such that the first and second adhesive tapes are positioned toward opposite edges of the main body on opposite surfaces thereof, and wherein the first and second adhesive tapes are bonded to the respective surfaces of the main body prior to installation of the roofing membrane on a roof.

2. The roofing membrane of claim 1, further comprising a membrane material releasably coupled with a top surface of either or both the first adhesive tape or the second adhesive tape to reduce environmental exposure of said adhesive tape.

3. The roofing membrane of claim 1, wherein a layer of the first adhesive tape has a greater width than a layer of the second adhesive tape atop the respective surfaces of the main body.

4. The roofing membrane of claim 1, wherein either or both the first adhesive tape or the second adhesive tape are bonded to the respective surfaces of the main body such that an edge of the respective adhesive tape is aligned with the respective first or second edge of the main body.

5. The roofing membrane of claim 1, wherein either or both the first adhesive tape or the second adhesive tape are bonded to the respective surfaces of the main body such that an edge of the respective adhesive tape extends outwardly of the outer perimeter of the main body from the respective first or second edge of the main body by between about 1/16 and 1/4 inch.

6. The roofing membrane of claim 1, wherein either or both the first adhesive tape or the second adhesive tape are bonded to the respective surfaces of the main body so as to extend along roughly the entire length of the respective first or second edge.

7. The roofing membrane of claim 1, wherein the material of the main body is ethylene propylene diene monomer rubber (EPDM).

8. The roofing membrane of claim 1, wherein the material of the main body is Thermoplastic PolyOlefin (TPO).

9. The roofing membrane of claim 1, further comprising a first membrane material releasable coupled with a top surface of the first adhesive tape and a second membrane material releasably coupled with a top surface of the second adhesive tape.

10. A roofing membrane comprising:
- a main body that is made of a material suitable for installation atop a roof surface for covering and protecting said surface, the main body having:
- a top surface;
- a bottom surface positioned opposite the top surface; and
- four edges that define an outer perimeter of the main body such that the main body has a rectangular or square profile;
- a first adhesive tape bonded to the top surface of the main body and positioned toward a first edge thereof, the first adhesive tape extending along a majority of a length of the first edge and extending outwardly of the outer perimeter of the main body from the first edge by between about 1/16 and 1/4 inch; and
- a second adhesive tape bonded to the bottom surface of the main body and positioned toward a second edge thereof, the second adhesive tape extending along a majority of a length of the second edge and extending outwardly of the outer perimeter of the main body from the second edge by between about 1/16 and 1/4 inch;
- wherein the second edge is positioned opposite the first edge such that the first and second adhesive tapes are positioned toward opposite edges of the main body on opposite surfaces thereof.

11. The roofing membrane of claim 10, further comprising a membrane material releasably coupled with a top surface of either or both the first adhesive tape or the second adhesive tape to reduce environmental exposure of said adhesive tape.

12. The roofing membrane of claim 10, wherein either or both the first adhesive tape or the second adhesive tape are bonded to the respective surfaces of the main body so as to extend along roughly the entire length of the respective first or second edge.

13. The roofing membrane of claim 10, further comprising a first membrane material releasably coupled with a top surface of the first adhesive tape and a second membrane material releasably coupled with a top surface of the second adhesive tape.

14. A roofing membrane comprising:
- a main body that is made of a material suitable for installation atop a roof surface for covering and protecting said surface, the main body having:
- a top surface;
- a bottom surface positioned opposite the top surface; and
- four edges that define an outer periphery of the main body such that the main body has a rectangular or square profile;
- a first adhesive tape bonded to the top surface of the main body and positioned toward a first edge thereof, the first adhesive tape extending along a majority of a length of the first edge; and
- a second adhesive tape bonded to the bottom surface of the main body and positioned toward a second edge thereof, the second adhesive tape extending along a majority of a length of the second edge;
- wherein the second edge is positioned opposite the first edge such that the first and second adhesive tapes are positioned toward opposite edges of the main body on opposite surfaces thereof, and wherein the first and second adhesive tapes are bonded to the respective surfaces of the main body prior to coupling the roofing membrane with another roofing membrane of similar configuration such that when the roofing membrane is coupled with the other roofing membrane, an adhesive tape on tape coupling is formed.

\* \* \* \* \*